(12) United States Patent
Hsu et al.

(10) Patent No.: US 10,019,931 B2
(45) Date of Patent: Jul. 10, 2018

(54) ELECTRONIC PAPER DISPLAY APPARATUS AND DRIVING METHOD THEREOF

(71) Applicant: E Ink Holdings Inc., Hsinchu (TW)

(72) Inventors: Kuo-Han Hsu, Taoyuan (TW); Mon-Wei Wu, Taoyuan (TW); Yi-Te Lee, Taoyuan (TW); Wei-Cheng Lin, Taoyuan (TW); Chi-Wei Lin, Taoyuan (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 15/393,221

(22) Filed: Dec. 28, 2016

(65) Prior Publication Data

US 2017/0193894 A1 Jul. 6, 2017

(30) Foreign Application Priority Data

Dec. 31, 2015 (TW) .............................. 104144590 A (51) Int. Cl.
*G09G 5/10* (2006.01)
*G09G 3/20* (2006.01)
*G06F 3/0483* (2013.01)

(52) U.S. Cl.
CPC ......... *G09G 3/2092* (2013.01); *G06F 3/0483* (2013.01)

(58) Field of Classification Search
CPC ........ G09G 3/20; G09G 3/2003; G09G 3/204; G09G 3/2055; G09G 3/2092; G09G 3/34; G09G 3/344; G09G 5/02; G09G 5/06; G09G 5/08; G09G 5/14; G09G 5/36; G09G 5/39; G09G 5/393; G09G 5/395; G06F 3/038; G06F 3/0481; G06F 15/00; G06T 1/00

See application file for complete search history.

(56) References Cited

U.S. PATENT DOCUMENTS 5,629,720 A 5/1997 Cherry et al.
7,249,324 B2 * 7/2007 Nakamura ............ G06F 1/1616
345/1.1

(Continued)

FOREIGN PATENT DOCUMENTS

TW 201033968 9/2010
TW 201214380 4/2012

OTHER PUBLICATIONS

"Office Action of Taiwan Counterpart Application", dated Feb. 9, 2017, p. 1-7.

*Primary Examiner* — Joe H Cheng
(74) *Attorney, Agent, or Firm* — JCIPRNET (57) ABSTRACT

An electronic paper display apparatus including an electronic paper display panel to display an image page, a display driver coupled to the electronic paper display panel, and a data processor coupled to the display driver. The display driver drives the electronic paper display panel to display a plurality of image frames according to image data, so as to display the image page. The data processor converts a first look-up table into a second look-up table and merges a current frame and a previous frame into a combined frame. The data processor generates the image data according to the combined frame and the second look-up table and outputs the image data. The image frames include the current frame and the previous frame. A driving method of the electronic paper display apparatus is also provided.

14 Claims, 6 Drawing Sheets

(56) References Cited

U.S. PATENT DOCUMENTS

| | | | |
|---|---|---|---|
| 7,312,794 B2 * | 12/2007 | Zehner | G02F 1/167 345/214 |
| 8,237,733 B2 * | 8/2012 | Rhodes | G09G 3/344 345/107 |
| 8,373,649 B2 | 2/2013 | Low et al. | |
| 8,587,597 B2 | 11/2013 | Rhodes | |
| 8,823,722 B1 * | 9/2014 | Huang | G09G 5/395 345/5 |
| 8,970,473 B2 | 3/2015 | Hsu et al. | |
| 9,721,495 B2 * | 8/2017 | Harrington | G09G 3/2007 |
| 2009/0153496 A1 * | 6/2009 | Kurihara | G09G 3/344 345/173 |
| 2011/0050544 A1 * | 3/2011 | Tomono | G06F 3/1446 345/1.3 |
| 2012/0013580 A1 * | 1/2012 | Lin | G09G 3/344 345/204 |
| 2012/0019509 A1 | 1/2012 | Wei et al. | |
| 2012/0188272 A1 * | 7/2012 | Wang | G09G 3/344 345/629 |
| 2012/0200610 A1 * | 8/2012 | Sakamoto | G09G 3/344 345/690 |
| 2013/0285958 A1 * | 10/2013 | Nishimura | G06F 3/0416 345/173 |
| 2014/0139500 A1 * | 5/2014 | Kimura | G09G 5/12 345/204 |
| 2014/0192079 A1 | 7/2014 | Lee et al. | |
| 2015/0198978 A1 * | 7/2015 | Catchpole | G06F 1/1632 345/173 |
| 2016/0055787 A1 * | 2/2016 | Matsuyama | G09G 3/344 345/691 |
| 2017/0193940 A1 * | 7/2017 | Hsu | G09G 3/3648 |

\* cited by examiner

| first grayscale digital code combination | second grayscale digital code combination |
|---|---|
| 0000 | 0000 |
| 0000 | 0001 |
| 0000 | 0010 |
| 0000 | 0011 |
| ⋮ | ⋮ |
| ⋮ | ⋮ |
| 1111 | 0111 |
| 1111 | 1011 |
| 1111 | 1111 |

FIG. 3

| address column | third grayscale digital code combination |
|---|---|
| address 1 | 00000000 |
| address 2 | 00000001 |
| address 3 | 00000010 |
| address 4 | 00000011 |
| ⋮ | ⋮ |
| ⋮ | ⋮ |
| address N−2 | 11110111 |
| address N−1 | 11111011 |
| address N | 11111111 |

ELECTRONIC PAPER DISPLAY APPARATUS AND DRIVING METHOD THEREOF

CROSS-REFERENCE TO RELATED APPLICATION

This application claims the priority benefit of Taiwan application serial no. 104144590, filed on Dec. 31, 2015. The entirety of the above-mentioned patent application is hereby incorporated by reference herein and made a part of this specification.

BACKGROUND OF THE INVENTION

Field of the Invention

The invention relates to a display apparatus and a driving method thereof and more particularly relates to an electronic paper display apparatus and a driving method thereof.

Description of Related Art

The electronic paper display apparatus is a novel display apparatus and has been widely used in electronic readers (e.g. electronic books and electronic newspaper) or other electronic devices (e.g. electronic tags).

Generally, in order to display image frames, the electronic paper display apparatus needs to obtain a relationship between gray tones of each pixel in the current frame and the previous frame for selecting the corresponding digital data to drive the electronic paper display panel. However, according to the current technology, usually the data processor can only obtain the relationship between gray tones of one pixel in the current frame and the previous frame at a time. Moreover, the data processor obtains the digital data by comparing the gray tone of one pixel in the previous frame to the gray tone of one pixel in the current frame to obtain the gray tone change. The data processor then selects the corresponding digital data according to such gray tone change. For this reason, the driving method for the electronic paper display apparatus is inefficient in data processing and uncompetitive.

SUMMARY OF THE INVENTION

The invention provides an electronic paper display apparatus and a driving method thereof for improving data processing efficiency.

The invention provides an electronic paper display apparatus, which includes an electronic paper display panel displaying an image page, a display driver coupled to the electronic paper display panel to drive the electronic paper display panel to display a plurality of image frames according to image data, so as to display the image page, and a data processor coupled to the display driver. The data processor converts a first look-up table into a second look-up table and merges a current frame and a previous frame into a combined frame. The data processor generates the image data according to the combined frame and the second look-up table and outputs the image data to the display driver. The image frames include the current frame and the previous frame.

In an embodiment of the invention, the electronic paper display apparatus further includes a storage device coupled to the data processor to store the first look-up table, the second look-up table, the current frame, the previous frame, and the combined frame.

In an embodiment of the invention, the first look-up table includes a corresponding relationship between a first grayscale digital code combination of a plurality of pixels in the previous frame and a second grayscale digital code combination of the pixels in the current frame. The second look-up table includes a corresponding relationship between a plurality of addresses and a third grayscale digital code combination of the pixels in the combined frame. The third grayscale digital code combination includes the first grayscale digital code combination and the second grayscale digital code combination.

In an embodiment of the invention, the data processor looks up the third grayscale digital code combination of the pixels in the combined frame according to the addresses, so as to generate the image data. The image data includes the third grayscale digital code.

In an embodiment of the invention, the current frame includes a plurality of current pixel columns and the previous frame includes a plurality of previous pixel columns. In the combined frame, the current pixel columns and the previous pixel columns are alternately arranged.

In an embodiment of the invention, the combined frame includes a plurality of combined pixel columns, and the previous pixel columns are arranged to be odd-numbered combined pixel columns of the combined pixel columns. The current pixel columns are arranged to be even-numbered combined pixel columns of the combined pixel columns.

In an embodiment of the invention, the combined frame includes a plurality of combined pixel columns, and the current pixel columns are arranged to be odd-numbered combined pixel columns of the combined pixel columns. The previous pixel columns are arranged to be even-numbered combined pixel columns of the combined pixel columns.

The invention provides a driving method of an electronic paper display apparatus, which includes: converting a first look-up table into a second look-up table and merging a current frame and a previous frame into a combined frame; generating image data according to the combined frame and the second look-up table; and driving an electronic paper display panel to display a plurality of image frames according to the image data, so as to display an image page. The image frames include the current frame and the previous frame. The electronic paper display apparatus includes the electronic paper display panel.

In an embodiment of the invention, the driving method further includes: storing the first look-up table, the second look-up table, the current frame, the previous frame, and the combined frame in a storage device. The electronic paper display apparatus includes the storage device.

In an embodiment of the invention, the first look-up table includes a corresponding relationship between a first grayscale digital code combination of a plurality of pixels in the previous frame and a second grayscale digital code combination of the pixels in the current frame. The second look-up table includes a corresponding relationship between a plurality of addresses and a third grayscale digital code combination of the pixels in the combined frame. The third grayscale digital code combination includes the first grayscale digital code combination and the second grayscale digital code combination.

In an embodiment of the invention, in the step of generating the image data according to the combined frame and the second look-up table, the third grayscale digital code combination of the pixels in the combined frame is looked up according to the addresses, so as to generate the image data. The image data includes the third grayscale digital code.

In an embodiment of the invention, the current frame includes a plurality of current pixel columns and the previous frame includes a plurality of previous pixel columns. In the combined frame, the current pixel columns and the previous pixel columns are alternately arranged.

In an embodiment of the invention, the combined frame includes a plurality of combined pixel columns, and the previous pixel columns are arranged to be odd-numbered combined pixel columns of the combined pixel columns. The current pixel columns are arranged to be even-numbered combined pixel columns of the combined pixel columns.

In an embodiment of the invention, the combined frame includes a plurality of combined pixel columns, and the current pixel columns are arranged to be odd-numbered combined pixel columns of the combined pixel columns. The previous pixel columns are arranged to be even-numbered combined pixel columns of the combined pixel columns.

Based on the above, in the exemplary embodiments of the invention, the data processor of the electronic paper display apparatus generates the image data according to the combined frame and the second look-up table, so as to improve the data processing efficiency.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

The following will describe some embodiments as examples of the invention. However, it should be noted that the invention is not limited to the disclosed embodiments. The term "couple" used throughout this specification (including the claims) may refer to any direct or indirect connection means. In addition, the term "signal" may refer to at least one of current, voltage, charge, temperature, data, or one or more signals.

Figure 1:
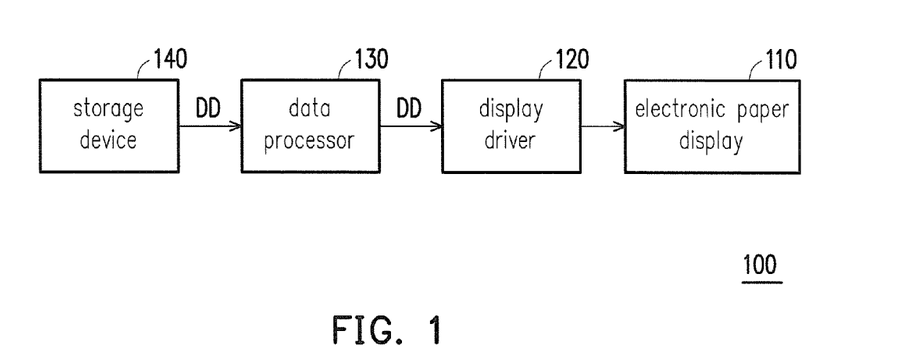
FIG. 1 is a block diagram of the electronic paper display apparatus according to an embodiment of the invention.

FIG. 1 is a block diagram of an electronic paper display apparatus according to an embodiment of the invention. Referring to FIG. 1, an electronic paper display apparatus 100 of this embodiment includes an electronic paper display panel 110, a display driver 120, a data processor 130, and a storage device 140. In this embodiment, the storage device 140 is coupled to the data processor 130, the data processor 130 is coupled to the display driver 120, and the display driver 120 is coupled to the electronic paper display panel 110. The display driver 120 drives the electronic paper display panel 110 to display an image page. Specifically, the storage device 140 stores image data DD and other data related to the image data DD, such as data identical or similar to a look-up table. Moreover, the data processor 130 accesses the image data DD from the storage device 140 to perform a data processing operation on the accessed image data DD and output the image data DD to the display driver 120. The display driver 120 drives the electronic paper display panel 110 to display a plurality of image frames according to the image data DD, so as to display the image page. In this embodiment, the image frame is a frame of one driving voltage, and the fame to be displayed by the electronic paper display panel 110 each time is the image page. The image page is formed of a plurality of image frames.

In this embodiment, the data processor 130 includes a central processing unit (CPU), a microprocessor, a digital signal processor (DSP), a programmable controller, a programmable logic device (PLD), other similar devices, or a combination of the foregoing, for example. Nevertheless, the invention is not limited thereto. In this embodiment, the storage device 140 includes a register circuit, for example, which may be disposed inside or outside the data processor 130. In an embodiment, the storage device 140 includes a flash drive, a memory card, a mechanical hard drive, a solid state drive (SSD), a cloud server, a SD card, a MMC card, a memory stick, a CF card, an embedded storage device, other similar devices, or a combination of the foregoing, for example. Nevertheless, the invention is not limited thereto.

Figure 2:
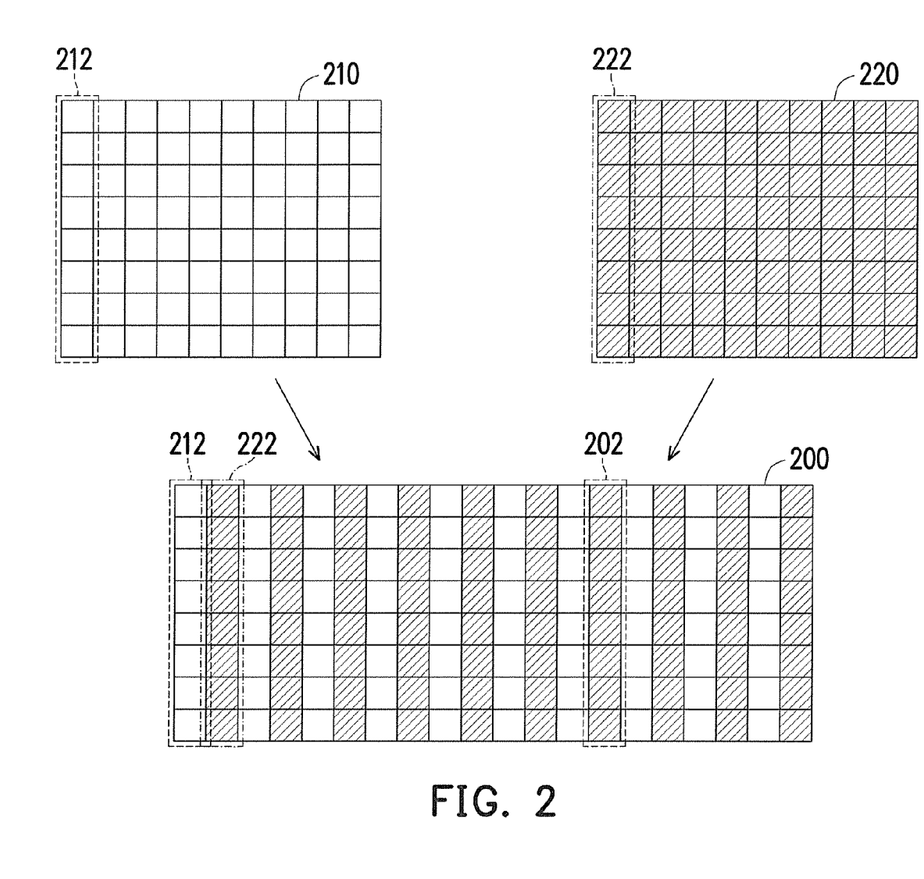
FIG. 2 is a schematic diagram of combining different image frames according to an embodiment of the invention.

FIG. 2 is a schematic diagram of combining different image frames according to an embodiment of the invention. Referring to FIG. 1 and FIG. 2, in this embodiment, when the display driver 120 is to drive the electronic paper display panel 110 to display the image frames, usually the data processor 130 obtains the image data DD of a current frame 220 and a previous frame 210 first, so as to analyze whether the gray tones displayed by the pixels in the current frame 220 and the previous frame 210 have changed. Take one image frame that has two gray tones for example, a specific pixel may display white in the previous frame 210 and the image data DD thereof corresponds to a digital code "1", for example. The same pixel may display black in the current frame 220 and the image data DD thereof corresponds to a digital code "0", for example. The change of the digital code "1" of the image data DD indicates that the gray tone displayed by this pixel changes from white to black. On the other hand, the pixel may display black in the previous frame 210 and display white in the current frame 220. In this embodiment, the gray tone displayed by the pixel may remain unchanged. For example, the pixel may display black or white in both the previous frame 210 and the current frame 220. In this embodiment, the data processor 130 determines change of the gray tones displayed by a plurality of pixels in the current frame 220 and the previous frame 210 by referring to a look-up table based on addresses.

Figure 3:
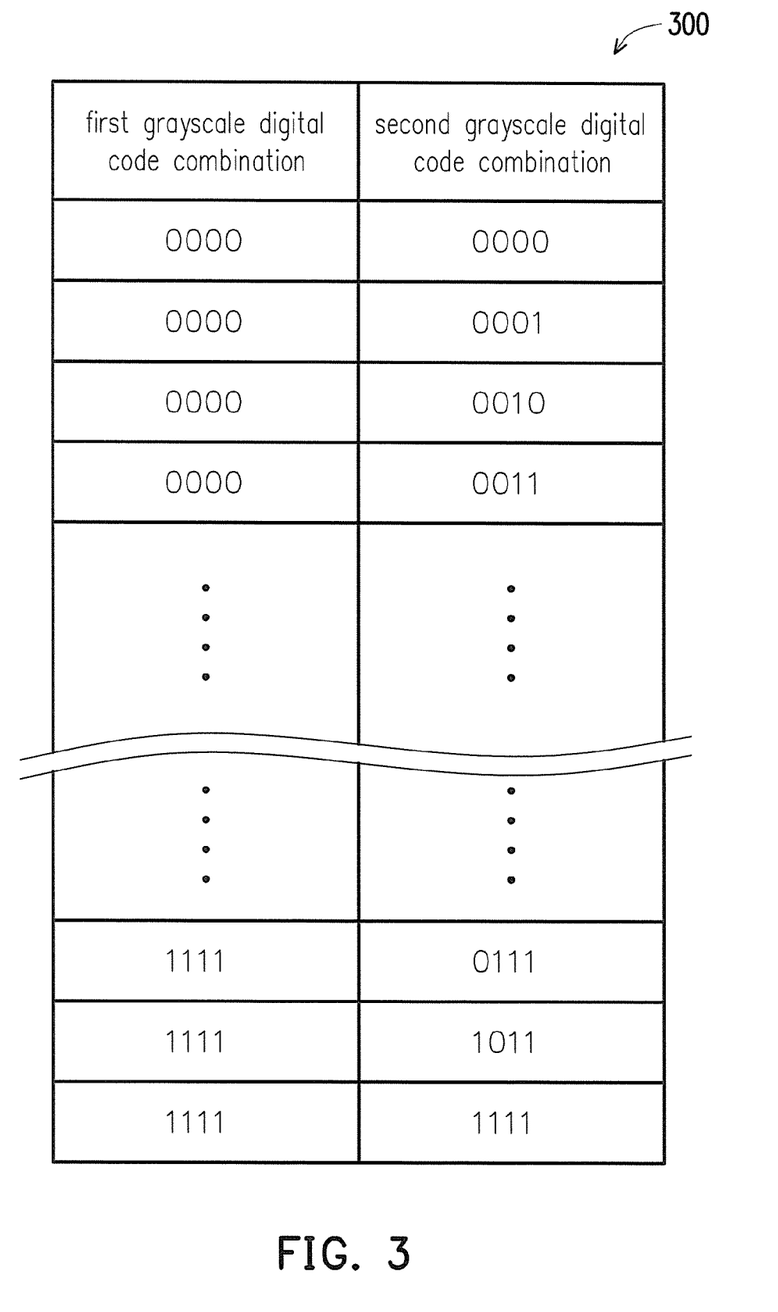
FIG. 3 is a schematic diagram of the first look-up table according to an embodiment of the invention.
Figure 4:
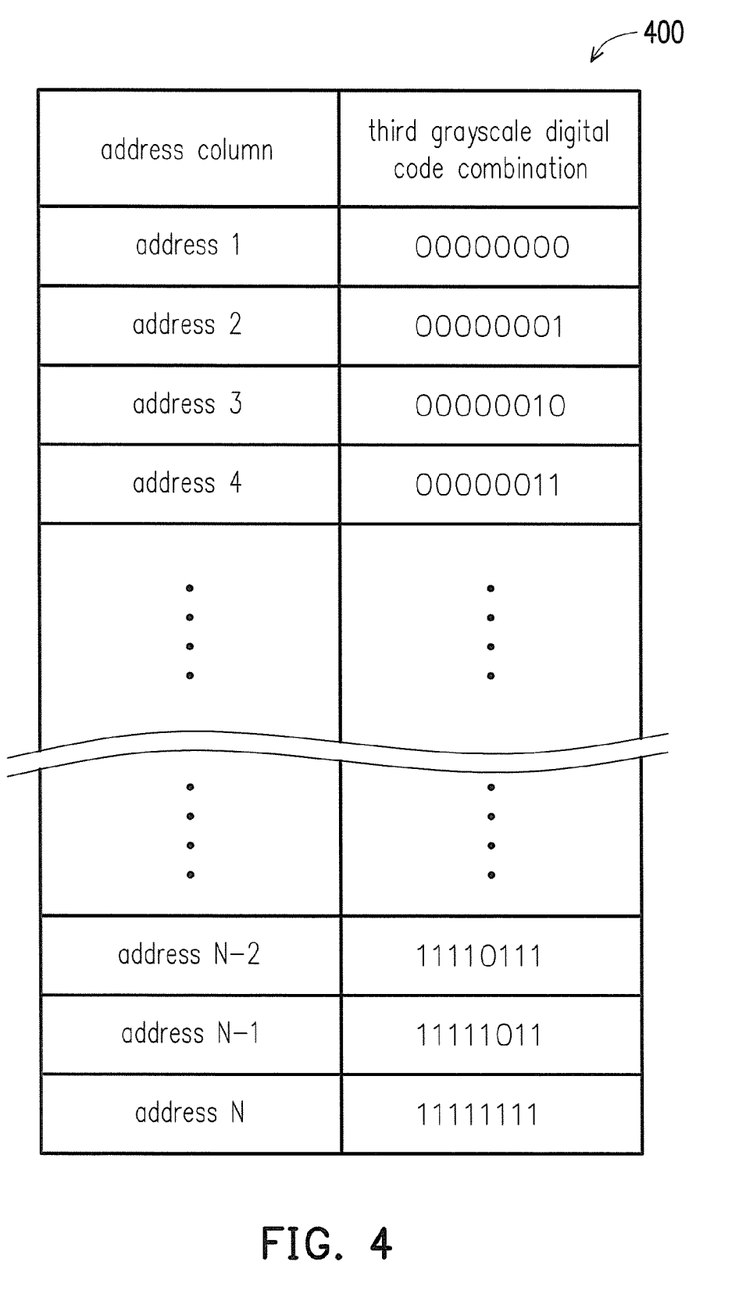
FIG. 4 is a schematic diagram of the second look-up table according to an embodiment of the invention.

FIG. 3 is a schematic diagram of a first look-up table according to an embodiment of the invention. FIG. 4 is a schematic diagram of a second look-up table according to an embodiment of the invention. In FIG. 4, N is 256, for example.

Referring to FIG. 1, FIG. 3, and FIG. 4, in this embodiment, a left column of a first look-up table 300 lists a first grayscale digital code combination of four pixels in the previous frame 210 and a right column lists a second grayscale digital code combination of four pixels in the current frame 220. The first look-up table 300 includes a corresponding relationship between the first grayscale digital code combination and a second grayscale digital code combination.

In this embodiment, a left column of a second look-up table 400 lists a plurality of addresses and a right column lists a third grayscale digital code combination of eight pixels in the previous frame 210 and the current frame 220. The third grayscale digital code combination includes eight digital codes, which include the first grayscale digital code combination and the second grayscale digital code combination. In FIG. 3 and FIG. 4, the digital code "1" indicates that the pixel displays white in the image frame after being driven by this digital code and the digital code "0" indicates that the pixel displays black in the image frame after being driven by this digital code. However, this corresponding relationship is merely an example, and the invention is not limited thereto. Moreover, the number of the pixels in the look-up table as described in this embodiment should not be construed as a limitation to the invention.

In this embodiment, the data processor 130 converts the first look-up table 300 into the second look-up table 400 to obtain the corresponding relationship of the third grayscale digital code combination of a plurality of addresses and a plurality of pixels. In an embodiment, the first look-up table 300 may be stored in advance in the storage device 140 to be accessed by the data processor 130, or may be directly inputted into the data processor 130 from an external data source. Alternatively, in an embodiment, the data processor 130 may generate the first look-up table 300 according to the relationship between the pixel and the displayed gray tone, and then store the first look-up table 300 in the storage device 140. In this embodiment, after the data processor 130 converts the first look-up table 300 into the second look-up table 400, the data processor 130 stores the second look-up table 400 in the storage device 140 to be referred to when outputting the image data DD to the display driver 120. In this embodiment, the image data DD outputted by the data processor 130 includes the third grayscale digital code combination. Thus, in this embodiment, the data processor 130 directly uses the addresses in the second look-up table 400 to find the image data DD that is to be outputted, so as to improve the data processing efficiency. Moreover, in this embodiment, the third grayscale digital code combination includes the first grayscale digital code combination of four pixels and the second grayscale digital code combination of four pixels. Therefore, the data processor 130 looks up the change of gray tones of four pixels in the image frame at a time according to the address in the second look-up table 400.

In this embodiment, before the data processor 130 uses the addresses in the second look-up table 400 to look up the image data DD to be outputted, the data processor 130 merges the current frame 220 and the previous frame 210 into a combined frame 200. It should be noted that the aforementioned sequence of the operation of converting the look-up tables and the operation of merging the image frames should not be construed as a limitation to the invention. Referring to FIG. 2, in this embodiment, the data processor 130 merges the current frame 220 and the previous frame 210 into the combined frame 200. The current frame 220 includes a plurality of current pixel columns 222 and the previous frame 210 includes a plurality of previous pixel columns 212. In the combined frame 200, the current frame 220 and the previous frame 210 are merged, such that the current pixel columns 222 and the previous pixel columns 212 alternately arranged. In this embodiment, the combined frame 200 includes a plurality of combined pixel columns 202. The previous pixel columns 212 are arranged to be odd-numbered combined pixel columns of the combined pixel columns 202. The current pixel columns 222 are arranged to be even-numbered combined pixel columns of the combined pixel columns 202. In other words, in the combined frame 200 of FIG. 2, starting with the current pixel columns 222, the current pixel columns 222 and the previous pixel columns 212 are alternately arranged from left to right. Nevertheless, it should be noted that the invention is not limited thereto. In an embodiment, the previous pixel columns 212 may be the even-numbered combined pixel columns of the combined pixel columns 202. The current pixel columns 222 may be the odd-numbered combined pixel columns of the combined pixel columns 202.

Therefore, in this embodiment, the data processor 130 converts the first look-up table 300 into the second look-up table 400 and merges the current frame 220 and the previous frame 210 into the combined frame 200. The data processor 130 generates the image data DD according to the combined frame 200 and the second look-up table 400 and outputs the image data DD to the display driver 120. Then, the display driver 120 drives the electronic paper display panel 110 to display a plurality of image frames according to the image data DD, so as to display the image page.

Figure 5:
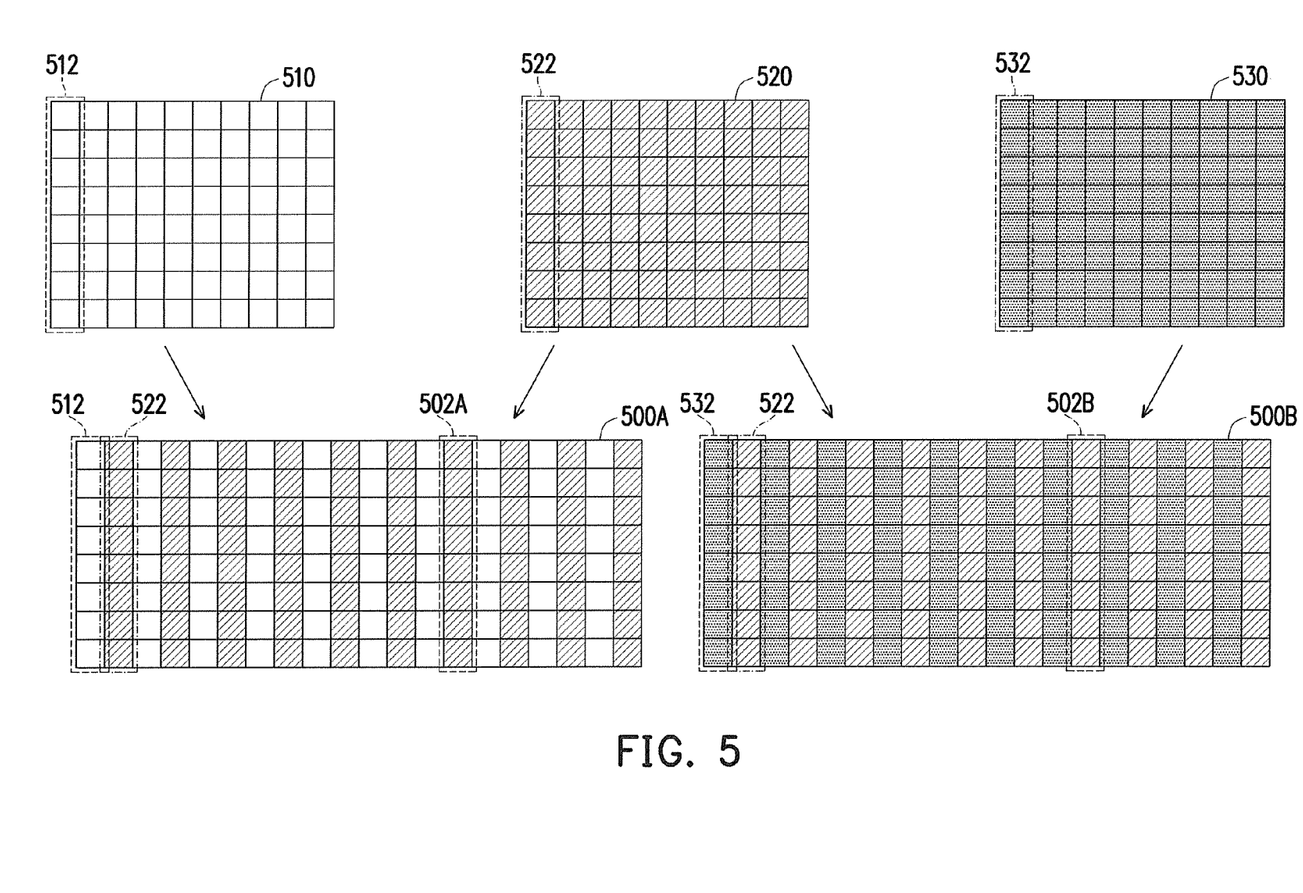
FIG. 5 is a schematic diagram of combining different image frames according to another embodiment of the invention.

FIG. 5 is a schematic diagram of combining different image frames according to another embodiment of the invention. Referring to FIG. 1 and FIG. 5, in this embodiment, the electronic paper display panel 110 displays a first image frame 510, a second image frame 520, and a third image frame 530 in sequence, for example. When the second image frame 520 is the current frame, the first image frame 510 is the previous frame. Likewise, when the third image frame 530 is the current frame, the second image frame 520 is the previous frame.

Specifically, at a first timing, when the electronic paper display panel 110 is to display the second image frame 520, for example, the data processor 130 merges the first image frame 510 and the second image frame 520 into a first combined frame 500A. In the first combined frame 500A, previous pixel columns 512 are arranged to be the odd-numbered combined pixel columns of the combined pixel columns 502A. Current pixel columns 522 are arranged to be the even-numbered combined pixel columns of the combined pixel columns 502A. Next, at a second timing, when the electronic paper display panel 110 is to display the third image frame 530, for example, the data processor 130 merges the second image frame 520 and the third image frame 530 into a second combined frame 500B. In the second combined frame 500B, current pixel columns 532 are arranged to be the odd-numbered combined pixel columns of the combined pixel columns 502B. Previous pixel columns 522 are arranged to be the even-numbered combined pixel columns of the combined pixel columns 502B.

Therefore, in comparison with the first combined frame 500A, when the data processor 130 merges the second image frame 520 and the third image frame 530 into the second combined frame 500B, the position of the pixel column of the second image frame 520 in the first combined frame 500A remains unchanged while the pixel column of the first image frame 510 is replaced by the pixel column of the third image frame 530 in the first combined frame 500A, thereby generating the second combined frame 500B. Accordingly, the method improves the data processing efficiency when the data processor 130 merges the second image frame 520 and the third image frame 530 into the second combined frame 500B.

Figure 6:
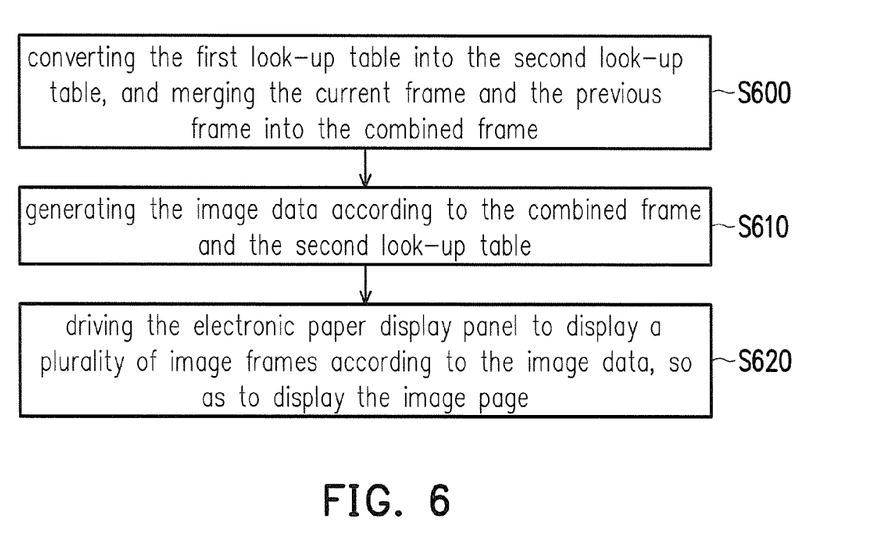
FIG. 6 is a flowchart showing the driving method of the electronic paper display apparatus according to an embodiment of the invention.

FIG. 6 is a flowchart showing a driving method of the electronic paper display apparatus according to an embodiment of the invention. Referring to FIG. 1 and FIG. 6, the driving method of this embodiment is at least applicable to the electronic paper display apparatus 100 of FIG. 1. In Step S600, the electronic paper display apparatus 100 converts the first look-up table 300 into the second look-up table 400 and merges the current frame 220 and the previous frame 210 into the combined frame 200. Next, in Step S610, the electronic paper display apparatus 100 generates the image data DD according to the combined frame 200 and the second look-up table 400. In Step S620, the electronic paper display apparatus 100 drives the electronic paper display panel 110 to display a plurality of image frames according to the image data DD, so as to display the image page. Furthermore, the driving method of the electronic paper display apparatus according to this embodiment can be understood sufficiently from the teaching, suggestion, and illustration of the embodiments of FIG. 1 to FIG. 5. Thus, details thereof are not repeated hereinafter.

In the exemplary embodiments of FIG. 1 to FIG. 6, the image frame displays two gray tones for example. However, the invention is not limited thereto. In an embodiment, each pixel in the image frame may display three or more gray tones. In an example where the image frame displays four gray tones, the pixel may be driven by digital codes "00," "01," "10," and "11" to display a first gray tone, a second gray tone, a third gray tone, and a fourth gray tone. In this embodiment, the third grayscale digital code combination of the second look-up table 400 includes sixteen digital codes, and the driving method for the electronic paper display apparatus thereof can be understood sufficiently from the teaching, suggestion, and illustration of the embodiments of FIG. 1 to FIG. 6. Thus, details thereof are not repeated hereinafter.

To conclude the above, in the exemplary embodiments of the invention, the data processor of the electronic paper display apparatus looks up the grayscale digital code combination related to multiple pixels in the second look-up table at a time according to the data of the combined frame and thereby improves the data processing efficiency. In addition, the driving method disclosed in the exemplary embodiments of the invention is applicable for driving the electronic paper display apparatus including image frames that display two or more gray tones.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. An electronic paper display apparatus, comprising:
   an electronic paper display panel displaying an image page;
   a display driver coupled to the electronic paper display panel to drive the electronic paper display panel to display a plurality of image frames according to image data, so as to display the image page; and
   a data processor coupled to the display driver to convert a first look-up table into a second look-up table and merge a current frame and a previous frame into a combined frame, wherein the data processor generates the image data according to the combined frame and the second look-up table and outputs the image data to the display driver, and the image frames comprise the current frame and the previous frame.

2. The electronic paper display apparatus according to claim 1, further comprising:
   a storage device coupled to the data processor to store the first look-up table, the second look-up table, the current frame, the previous frame, and the combined frame.

3. The electronic paper display apparatus according to claim 1, wherein the first look-up table comprises a corresponding relationship between a first grayscale digital code combination of a plurality of pixels in the previous frame and a second grayscale digital code combination of the pixels in the current frame, and the second look-up table comprises a corresponding relationship between a plurality of addresses and a third grayscale digital code combination of the pixels in the combined frame, wherein the third grayscale digital code combination comprises the first grayscale digital code combination and the second grayscale digital code combination.

4. The electronic paper display apparatus according to claim 3, wherein the data processor looks up the third grayscale digital code combination of the pixels in the combined frame according to the addresses, so as to generate the image data, wherein the image data comprises the third grayscale digital code combination.

5. The electronic paper display apparatus according to claim 1, wherein the current frame comprises a plurality of current pixel columns and the previous frame comprises a plurality of previous pixel columns, wherein in the combined frame, the current pixel columns and the previous pixel columns are alternately arranged.

6. The electronic paper display apparatus according to claim 5, wherein the combined frame comprises a plurality of combined pixel columns, wherein the previous pixel columns are arranged to be odd-numbered combined pixel columns of the combined pixel columns and the current pixel columns are arranged to be even-numbered combined pixel columns of the combined pixel columns.

7. The electronic paper display apparatus according to claim 5, wherein the combined frame comprises a plurality of combined pixel columns, wherein the current pixel columns are arranged to be odd-numbered combined pixel columns of the combined pixel columns and the previous pixel columns are arranged to be even-numbered combined pixel columns of the combined pixel columns.

8. A driving method of an electronic paper display apparatus, which comprises an electronic paper display panel, the driving method comprising:
   converting a first look-up table into a second look-up table and merging a current frame and a previous frame into a combined frame;
   generating image data according to the combined frame and the second look-up table; and
   driving the electronic paper display panel to display a plurality of image frames according to the image data, so as to display an image page, wherein the image frames comprise the current frame and the previous frame.

9. The driving method according to claim 8, wherein the electronic paper display apparatus comprises a storage device, and the driving method further comprises:
   storing the first look-up table, the second look-up table, the current frame, the previous frame, and the combined frame in the storage device.

10. The driving method according to claim 8, wherein the first look-up table comprises a corresponding relationship between a first grayscale digital code combination of a plurality of pixels in the previous frame and a second grayscale digital code combination of the pixels in the current frame, and the second look-up table comprises a corresponding relationship between a plurality of addresses and a third grayscale digital code combination of the pixels in the combined frame, wherein the third grayscale digital code combination comprises the first grayscale digital code combination and the second grayscale digital code combination.

11. The driving method according to claim 10, wherein in the step of generating the image data according to the combined frame and the second look-up table, the third grayscale digital code combination of the pixels in the combined frame is looked up according to the addresses, so as to generate the image data, wherein the image data comprises the third grayscale digital code.

12. The driving method according to claim 8, wherein the current frame comprises a plurality of current pixel columns and the previous frame comprises a plurality of previous pixel columns, wherein in the combined frame, the current pixel columns and the previous pixel columns are alternately arranged.

13. The driving method according to claim 12, wherein the combined frame comprises a plurality of combined pixel columns, wherein the previous pixel columns are arranged to be odd-numbered combined pixel columns of the combined pixel columns and the current pixel columns are arranged to be even-numbered combined pixel columns of the combined pixel columns.

14. The driving method according to claim 12, wherein the combined frame comprises a plurality of combined pixel columns, wherein the current pixel columns are arranged to be odd-numbered combined pixel columns of the combined pixel columns and the previous pixel columns are arranged to be even-numbered combined pixel columns of the combined pixel columns.

\* \* \* \* \*